United States Patent Office 3,463,194
Patented Aug. 26, 1969

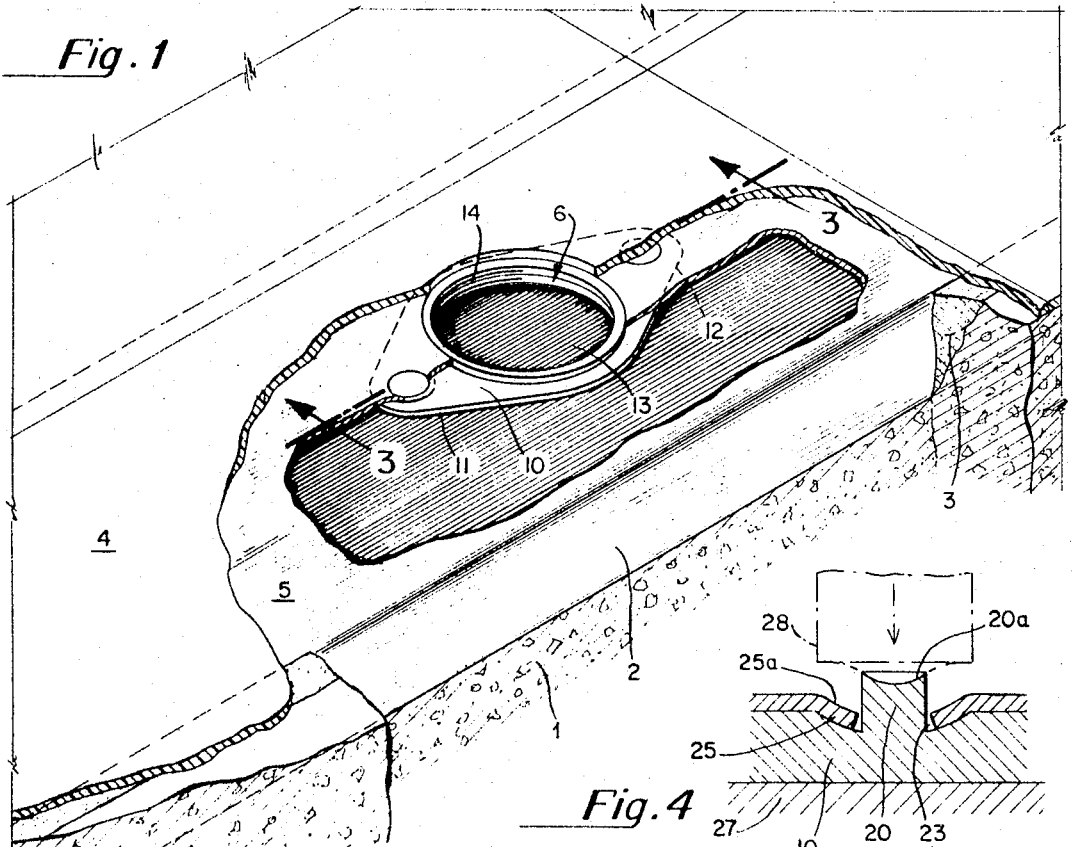
Fig. 1
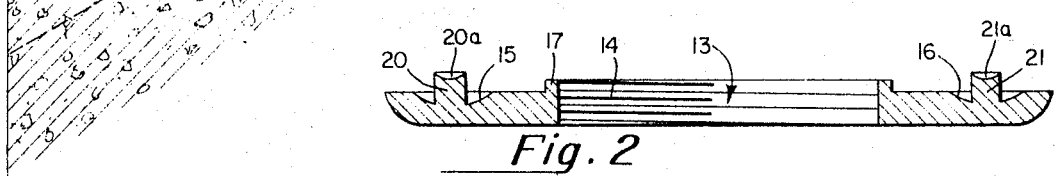
Fig. 2
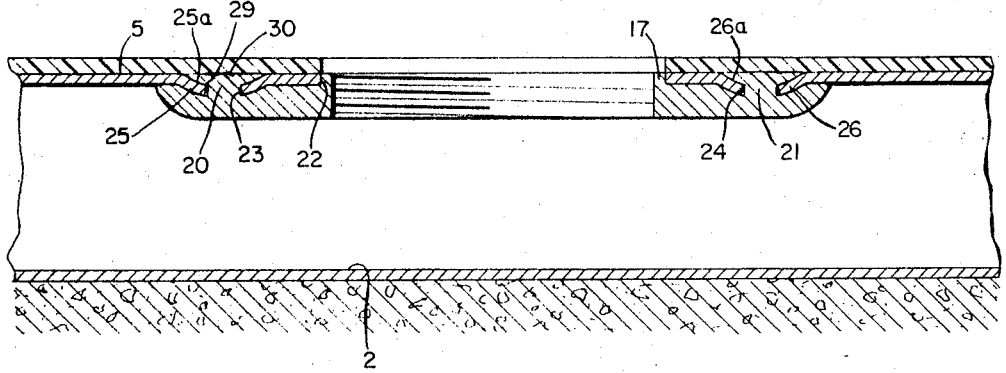
Fig. 3
Fig. 4

3,463,194
FLUSH DUCT INSERT
Charles T. Flachbarth, Parkersburg, W. Va., assignor to Textron Inc., Providence, R.I., a corporation of Delaware
Filed Aug. 17, 1967, Ser. No. 661,451
Int. Cl. F16l 55/10; H02g 3/04, 3/10
U.S. Cl. 138—92               5 Claims

ABSTRACT OF THE DISCLOSURE

A preset insert for a flush duct arranged to hold a plug or adaptor, the insert being inside of the duct and fixedly secured thereto.

---

This invention relates to underfloor distribution systems and in particular relates to improvements in flush ducts.

More specifically, the invention contemplates a flush duct provided with a plurality of preset or factory-set inserts each of which is constructed to hold a flush plug for non-use conditions and alternatively to hold an adaptor or a nipple when a floor fitting is to be secured to the duct. The insert is mounted inside the duct and arranged so that no part extends above the duct surface. This maintains surface smoothness for the laying of floor covering when the insert holds a flush plug.

The insert concept is a departure from the conventional manner of blocking off access holes in flush ducts in that the ordinary flush plug is threaded into the access hole and for the installation of a fitting the plug is removed and a ferrule is crimped to the edge of the hole. With the present invention the insert itself has threads which commonly serve to support either a flush plug or an adaptor.

One major disadvantage of the conventional flush plug is that it cannot be used in large diameter sizes suitable for modern day cable requirements. The number of threads which can be placed on the edge of an access hole is limited because the metal of the duct is relatively thin. This reduces load-bearing characteristics of the plug and the diameter must be small in order to minimize the chance of failure.

Accordingly, flush duct installations have been limited to the use of small diameter plugs. This is highly undesirable because present day power and communication requirements demand the use of larger access holes for the accommodation of heavier cables and a greater number of cables.

The insert is connected to the duct by a rivet-like structure which integrates the insert and the duct and employs a large number of supporting threads so as to give adequate support for large diameter plugs. The object of this design is to provide as many supporting threads as possible while maintaining a flush surface to the top of the assembly and introducing a minimum obstruction within the duct.

With the above-mentioned structure the load-carrying capability of the insert and a plug mounted therein are comparable to that of the duct itself.

The invention will be described below in connection with the following drawings wherein:

FIGURE 1 is a perspective view of a floor having the flush duct embedded therein;

FIGURE 2 is a side elevational view of the insert of the invention;

FIGURE 3 is a side elevational view of the duct with the insert installed in the top surface thereof; and FIGURE 4 is a side elevational view illustrating preferred tooling for use in securing the insert to the duct.

In FIGURE 1 the concrete floor 1 has a flush duct 2 embedded therein, the duct being held by the usual grouting 3. The floor covering 4 is disposed on the top surface 5 of the duct. The top surface 5 carries the insert 6 which has been preset in the factory at the time of duct manufacture. As shown the insert does not carry either a plug or an adaptor.

In plan it will be observed that the insert comprises an elongated metal body 10 which is tapered as indicated at 11 and 12. The body has a central aperture 13 threaded as indicated at 14. As best illustrated in FIGURE 2 there are a pair of concave cavities 15 and 16 which are disposed on opposite sides of the aperture 13. The body is formed with a flange 17 carrying part of the threads 13. Centrally of these cavities are the posts 20 and 21 which extend upwardly from the cavities, each post has a concave depression formed in the top thereof as indicated at 20a and 21a.

The manner in which the insert of FIGURE 2 is connected with the duct will be explained following:

The duct 2 is prepared to receive the insert as by being punched with an aperture 22 and on either side of the aperture is punched with the holes 23 and 24. The areas 25 and 26 immediately around the holes 23 and 24 are respectively depressed. The depressions are configured to correspond to the cavities 15 and 16.

The insert is put inside of the duct then moved to the top so that the flange 17 fits into the aperture 22, the posts 20 and 21 fit into the holes 23 and 24 and the depressed areas 25 and 26 fit into the cavities 15 and 16. It is to be noted that the depressed areas 25 and 26 form second cavities 25a and 26a. The fragmentary view in FIGURE 4 clearly shows the relationship of the parts. The insert is held in this position by tooling generally indicated at 27.

With the insert in the position as described, the posts 20 and 21 are deformed or spread into heads which lock the insert to the duct. For this operation a tool such as the tool 28 is made to contact the depression 20a and move downwardly on the post to cause the metal to flow outwardly and fill up the cavity 25a. This forms a head 29 on the post. The post and depression are configured so that the amount of metal displaced substantially fills up the cavity whereby the top surface 30 of the head 29 is flush with the top surface 5 of the duct. The post 21 is similarly deformed.

A flush plug is mounted in the insert simply by threading the same into the aperture 13. The top thread of the plug is rolled over and knurled to avoid the same being screwed through the aperture. When it is desired to install a floor fitting the plug is unthreaded and an appropriate nipple or adaptor is secured to the insert.

Preferably the insert is made of die-cast aluminum and the plug may be preferably of the same material.

The structure and deformation of the posts 20 and 21 has the effect of riveting the insert to the duct. The structural characteristics of this kind of joint and the depth of the threads 13 are such that the insert and plug have excellent load-bearing qualities.

I claim:
1. A preset insert for a flush duct comprising:
an elongated metal body to be disposed inside of a flush duct and having a threaded aperture for receiving a flush plug or an adaptor;
a pair of concave cavities in the surface of said body respectively disposed on opposite sides of said aperture; and
a pair of deformable posts integral with said body for securing the insert to the duct, the posts being respectively disposed centrally of said cavities and extending upwardly therefrom, each post having concave depressions formed in the top thereof.

2. A preset insert for a flush duct comprising:
an elongated metal body to be disposed inside of a flush duct and having a threaded aperture for receiving a flush plug on an adaptor;

a pair of concave cavities in the surface of said body respectively disposed on opposite sides of said aperture; and a pair of deformable posts integral with said body for securing the insert to the duct, the posts being respectively disposed centrally of said cavities and extending upwardly therefrom, each post being configured so that the metal thereof is deformable into a shape characterized as by a flat surface.

3. In combination:

a flush duct the top of which has an aperture and a pair of holes respectively on opposite sides of the aperture;

a preset insert having an elongated metal body secured inside of said duct below the top thereof and having a central threaded aperture, and flange means surrounding said central threaded aperture, the flange projecting into said duct aperture;

a pair of concave cavities respectively disposed in said body on opposite sides of the central aperture, and the top of the duct immediately surrounding said holes depressed into the cavities; and a pair of posts connected with said body and respectively disposed centrally of said cavities and extending upwardly therefrom into said holes and each post being deformed so that part of the same engages the top surface of the duct area depressed into said cavities and also being deformed so that the top surface thereof is substantially flush with the top surface of the duct.

4. In combination:

a flush duct the top of which has an aperture and a pair of holes respectively on opposite sides of the aperture;

a preset insert having an elongated metal body secured inside of said duct below the top thereof and a threaded aperture in said body in communication with said duct aperture;

a pair of concave cavities respectively disposed in said body on opposite sides of the body aperture, the top of the duct immediately around said holes being depressed into the cavities; and a pair of posts connected with said body and respectively disposed centrally of said cavities and extending upwardly therefrom into said holes and each post being deformed so that part of the same engages the top surface of the duct area depressed into said cavities and also being deformed so that the top surface thereof is substantially flush with the top surface of the duct.

5. In combination:

a flush duct the top of which has an aperture and a pair of holes respectively on opposite sides of the aperture;

a preset insert having an elongated metal body secured inside of said duct and below the top thereof, and an aperture in the insert in communication with said duct aperture;

a pair of concave cavities respectively disposed in said insert on opposite sides of the insert aperture, the top of the duct immediately around said holes being depressed into said insert cavities and the depressions forming a second pair of cavities respectively on the top of the duct; and a locking head in each said second cavity, the surface of which is substantially flush with the top surface of the duct and a post connected with each head and extending into said duct holes and connected with said body.

References Cited

UNITED STATES PATENTS 3,322,442   5/1967   Flachbarth _____ 138—92 XR
3,303,264   2/1967   Saul et al. _____ 174—48

HERBERT F. ROSS, Primary Examiner

U.S. Cl. X.R.

174—48